April 3, 1962

B. B. MATHIAS 3,027,798

METHOD OF AND APPARATUS FOR THE DETECTION
OF FLAWS IN TRANSLUCENT ARTICLES

Filed Oct. 3, 1958

INVENTOR
Benny Bert Mathias

BY
Mead, Browne, Schuyler & Beveridge
ATTORNEYS 3,027,798
METHOD OF AND APPARATUS FOR THE DETECTION OF FLAWS IN TRANSLUCENT ARTICLES
Benny B. Mathias, Toledo, Ohio, assignor to Owens-Illinois Glass Company, a corporation of Ohio
Filed Oct. 3, 1958, Ser. No. 765,110
8 Claims. (Cl. 88—14)

The present invention relates to a method of and apparatus for the detection of flaws in translucent articles. More particularly, this invention is concerned with the detection of checks in glass containers or the like by sensing any deviation in the optical transmission characteristics of the container caused by a check.

In the detection of flaws in glass containers, it has long been proposed that the container be scanned by a light beam, either visible or ultraviolet. The most critical portion of any container is the finish or neck portion, since finish flaws may either prevent accurate sealing of the containers or cause health hazards. The finish portions of jars, bottles or the like, particularly those adapted for "snap-on" lids, are of irregular radial configuration, that is the finish is provided with radially enlarged lid-engaging ribs, and of substantial regular axial configuration, e.g., the container is a regular article of rotation and the ribs are annular. To optically inspect such finishes has posed a great problem in the art, since the transmission of the light through the varying thickness of the radial rib normally would cause sufficient distortion to prevent accurate determination of the intensity of light passed by the finish portion of the container.

The present invention proposes a new and novel method of and apparatus for the detection of flaws in translucent articles, particularly articles of irregular radial configuration and/or of varying glass thickness. The term "translucent articles" is used in its generic sense to include articles capable of transmitting both visible and invisible light. Further, the present invention for the first time provides a means for the detection of checks or flaws under the finish as well as of radial checks in the finish. Briefly, the method of the present invention involves the rotation of the axially regular article about its axis, the positioning of an image corrector complementary to the irregular configuration of the container immediately adjacent the container, the transmission of one or more light beams through both the container and the corrector, and the conversion of the transmitted light beam into an electric impulse of correlative intensity. Any variation in the intensity of the beam impulse, causing it to deviate from a predetermined norm, can be utilized to actuate a reject signal means.

Structurally, the apparatus includes one or more light sources, a focusing means, such as an ellipsoidal mirror preferably disposed interiorly of the container to reflect light from the source through the finish and the image corrector or to receive light passing through the finish and the image corrector, one or more photocells receiving light passed through the finish and the corrector, and means responsive to the intensity of light received by the photocells.

It is, therefore, an important object of the present invention to provide an improved method for the detection of flaws in glass containers or the like of irregular configuration by sensing any deviation in the optical transmission characteristics of the container caused by the flaw.

Another important object of the present invention is the provision of an apparatus for the detection of flaws in translucent articles of irregular configuration and including an image corrector complementary to the irregular portion of the container, means for transmitting light through the irregular container portion and the image corrector and signal means responsive to the intensity of light transmitted.

It is a further object to provide an improved method for the detection of finish checks in a glass container, the finish being of irregular configuration, and involving the placing of an image corrector complementary to the irregular finish immediately adjacent the finish so that light can be transmitted through both the finish and the corrector for reception by intensity-responsive signal means.

Yet another important object is the provision of an apparatus for the detection of checks in a container finish and including a glass image corrector complementary to the finish for providing a radial composite check and corrector thickness uniform axially of the container for transmitting light from a source into finely focused relation to a light-sensitive reject signal means.

It is yet another object of this invention to provide a method for the detection of checks in a container finish of irregular thickness by positioning a translucent image corrector in juxtaposition to an irregular finish portion to convert the irregular finish portion to a uniform composite finish-corrector thickness through which light can be transmitted in focused beam to light-responsive reject signals.

Other objects and advantages of the invention will appear from the following detailed description taken in conjunction with the annexed drawings, in which.

As shown on the drawings.

Figure 1:
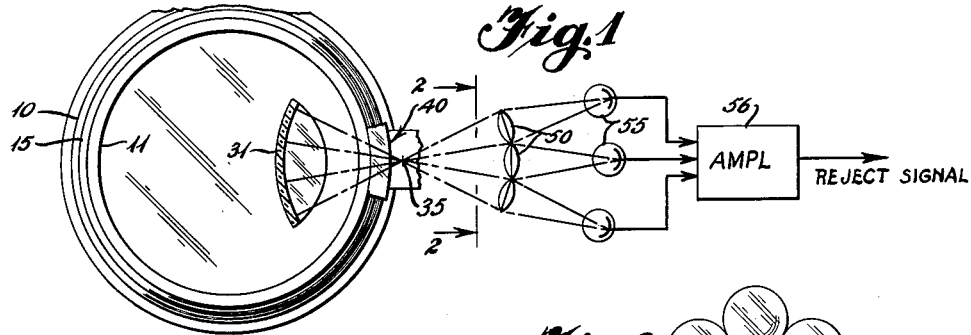
FIGURE 1 is a schematic plan view of an apparatus for carrying out the method of the present invention.

Reference numeral 10 refers to a container such as a jar having a reduced neck opening 11 defined by a container finish portion having a radially inwardly directed lower shoulder 12, a peripheral groove 13, and a radially enlarged lid-engaging rib 15.

The container 10 is disposed in and supported by a lower cup 20 disposed for rotation by a vertically extending shaft 21 adapted for rotation, as by a pulley 22 and a lapping belt 23.

Figure 3:
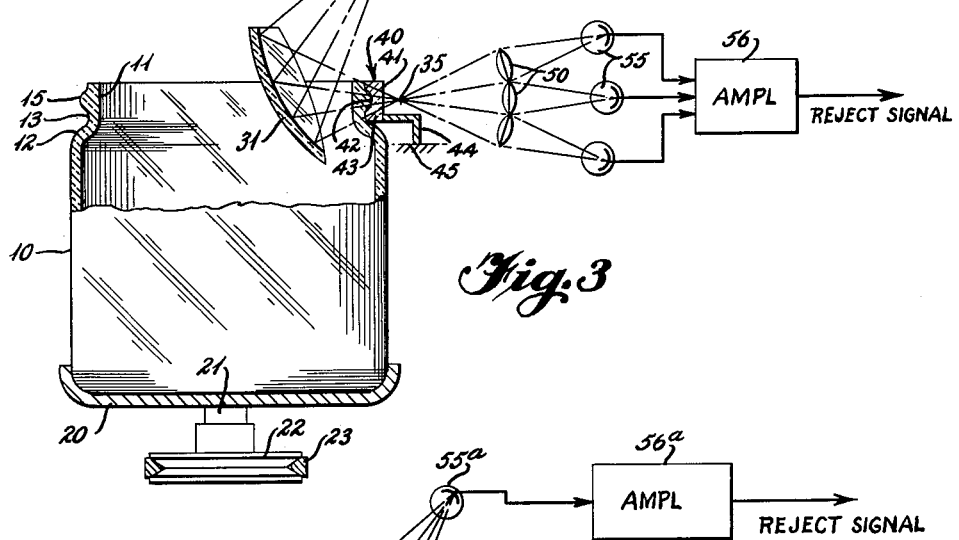
FIGURE 3 is a schematic elevational view of the apparatus of FIGURE 1.

Disposed generally above the container 10 outside the confines thereof is a light source located as at 30 for directing a beam of light onto a focusing means, such as an ellipsoidal mirror 31. This mirror 31 is preferably disposed as illustrated in FIGURE 3 partially interiorly of the container in substantial alignment with the finish portions 12–15, inclusive, of the container. The location of the light source 30 and the configuration and location of the ellipsoidal mirror 31 are such that an image is formed exteriorly of the container, as at point 35.

To compensate for the irregular radial configuration of the finish portions 12, 13 and 15 of the container and to obtain a sharp focal image at the point 35, which is the point of focus of the light from the source 30 as reflected by the mirror 31, an image corrector 40 is interposed between the finish and the focal point 35.

This image corrector 40 is complementary to the finish configuration, i.e., the image corrector is provided with an exterior surface 41 parallel to the inner neck surface 11 of the container 10 and the opposing surface of the corrector is provided with a groove 42 receiving the annular radially enlarged rib 15 of the finish with a lower, radially inwardly directed rib 43 conforming to the annular groove 13 of the finish to be seen from FIGURE 1 that the image corrector is of substantial arcuate extent. The image corrector is of such size, both arcuately (FIGURE 1) and vertically (FIGURE 3) as to receive therethrough substantially all of the light reflected by the ellipsoidal mirror through the finish to the focal point 35. Obviously, an annular image corrector may be utilized to completely cover the finish, although the difficulties of fitting the corrector to the annular finish will be readily appreciated.

Preferably, the arcuate corrector of FIGURES 1 and 3 is utilized, the corrector being fixed through a support structure 44 to a fixed portion of the inspection machine 45, as schematically illustrated in FIGURE 3.

The light beams passing through the focal point 35 diverge onto a plurality of focusing lenses 50 which focus the light into a series of finely divided beams directed to a corresponding number of similarly disposed photocells 55. The photocells 55 are incorporated in and form a part of a conventional amplifier circuit indicated diagrammatically at 56.

Figure 2:
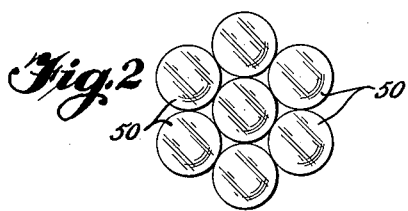
FIGURE 2 is a sectional view taken on the plane 2—2 of FIGURE 1.

The method of the present invention, as carried out by the apparatus of FIGURES 1–3, inclusive, involves the positioning of the container 10 in the rotatable holder or retainer 20, the rotation of the container about its vertical axis through the pulley 22 and belt 23, and the transmission of light from the source 30 onto the mirror 31 and hence through the finish portions 12, 13 and 15 of the container 10 and the image corrector 40.

It will be noted that the complementary finish and image corrector portions cooperatively define a uniform glass thickness. Preferably, the image corrector is formed of glass having optical characteristics of light transmission, defractions, etc., identical with the glass forming the container 10. The finish portions, together with the image corrector, form a composite glass structure of uniform thickness for transmitting the focused light from the mirror 31 to the focal point 35, so that the effect of radial irregularities in the finish groove 13 and rib 15 are compensated for by the corrector. Consequently, a sharp and accurately focused point 35 is obtained, and sharp beams of light are further focused by the lenses 50 onto the individual photocells 55.

Since the photocells 55 generate a current of intensity correlative to the intensity of light falling thereon, the presence of an irregularity, flaw, or other check in the finish will interrupt the image focused on the corresponding photocell 55, and the intensity of light falling on the photocell and the electrical output thereof will be decreased. This decrease will be exaggeratedly reflected in the amplifier circuit 56 and any decrease in the amplified photocell output can be readily detected and utilized to actuate a reject signal as is well known in the art.

It will be appreciated that one revolution of the container 10 will completely scan the finish thereof so as to yield complete inspection of the critical part of the container.

Figure 4:
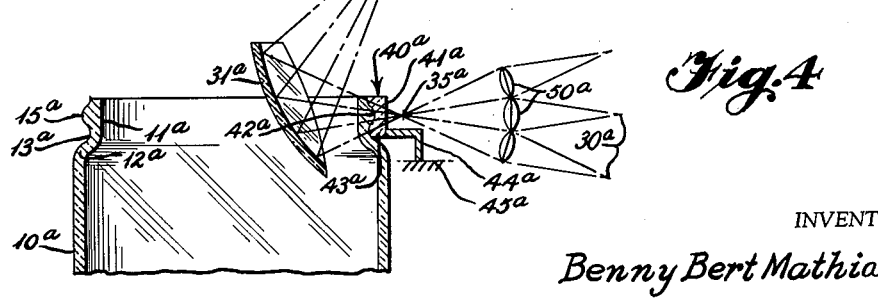
FIGURE 4 is a fragmentary elevational view similar to FIGURE 3 illustrating a modified apparatus of the present invention.

The modified apparatus utilized in FIGURE 4, the relative positions of the light sources and the photocells have been reversed. Identical reference numerals with the suffix "A" are utilized to point out identical portions of the apparatus of FIGURE 4.

It will be seen that a plurality of sources 30A are utilized with the plurality of lenses 50A focusing the beams of light from the sources at the focal point 35A, the focused beams then being transmitted through the corrector 40A and the section portions 13A and 15A of the container 10A onto the mirror 31A for reflection to a single photocell 55A is fed into the amplifier 56A from which a reject signal will be obtained as a check is detected by the apparatus.

From the foregoing detailed description, it will be appreciated that the present invention provides a method for the optical detection of checks in irregularly shaped portions of glass articles. Obviously, any glass article of irregular shape or thickness may be similarly inspected and the method is not limited to the detection of checks in container finishes.

While preferred embodiments have been described above in detail, it will be understood that numerous modifications might be resorted to without departing from the scope of the invention as defined in the following claims.

What is claimed is:

1. An apparatus for detecting flaws in a translucent article of irregular thickness comprising an image corrector complementary to a portion only of the article and cooperatively defining therewith a composite structure of uniform thickness, means providing relative movement between the article and the corrector, means for transmitting focused light through both that portion of said article defining the composite structure and said corrector during rotation during said relative movement, and means for detecting the intensity of the focused light so transmitted.

2. In an apparatus for detecting flaws in a translucent article of irregular thickness, an image corrector complementary to an annular portion of the article and cooperatively defining therewith a composite structure of uniform thickness, means supporting said corrector in juxtaposition to said article and accommodating relative movement therebetween, means for relatively rotating said article and said corrector, means for transmitting a beam of light through only the composite structure defined by the relatively rotating article and corrector, and means for detecting the intensity of light transmitted thereby.

3. In a method of detecting checks or other flaws in an article having an annular portion of irregular configuration, the steps of rotating the article about its axis, transmitting a light beam through said annular portion as said article is rotated, modifying the light leaving said annular portion to make the light correspond to light leaving a regular cylindrical surface of revolution about said axis and converting the transmitted light beam into an electric impulse of predetermined intensity.

4. In a method of predetecting checks in an article formed of translucent material of irregular thickness, the steps of passing a light beam through a uniform thickness of said translucent material defined by said article and a complementary image corrector immediately adjacent the article, moving the article relative to both the light beam and the image corrector to transmit the beam through various portions of the article and said corrector focusing and separating the transmitted light into component portions, and determining the intensity of each of said portions.

5. An apparatus for detecting flaws in an annular portion of a translucent article of irregular thickness comprising an arcuate image corrector complementary to a portion of the article annular portion and cooperatively defining with a portion of the annular article portion a composite structure of uniform thickness, means securing said arcuate corrector in juxtaposed position to said annular article portion, means for transmitting a beam of light through both said article and said corrector, means for moving said article portion arcuately relative to said corrector and said light beam, and means for detecting the intensity of light transmitted thereby.

6. In a method of detecting checks or other flaws in a container or the like formed of glass and having an annular portion of irregular configuration, the steps of successively and temporarily forming with arcuate portions of said annular portion a composite glass structure of uniform configuration, passing a light beam through said temporary composite structure, subdividing the transmitted beam into component beams, converting the transmitted component beams into electrical impulses of predetermined intensity, respectively, and deriving a reject signal when the intensity of any one of said impulses deviates from a predetermined norm.

7. An apparatus for detecting flaws in a translucent article of irregular thickness comprising an image corrector complementary to the article and cooperatively defining therewith a composite structure of uniform thickness, means for transmitting a beam of light from a source through both said article and said corrector, means for separating the transmitted light into component portions, and for focusing said portions, and a plurality of photocells for receiving said focused light portions, respectively, and means for detecting the intensity of light transmitted thereby.

8. A method of detecting checks or other flaws in a container or the like having a regular axial configuration but of irregular radial configuration, said method comprising the steps of rotating the container about its axis to cause successive arcuate portions thereof to move through an inspection zone, transmitting a beam of light through said arcuate portions at said inspection zone, modifying the light leaving said arcuate portions at said inspection zone to compensate for said irregular radial configuration so that said arcuate portions have characteristics similar to an arcuate portion of regular radial configuration, converting the transmitted light beam into an electrical signal of proportionate intensity, and deriving a control signal when the intensity of said electrical signal deviates from a predetermined norm.

References Cited in the file of this patent

UNITED STATES PATENTS

| | | |
|---|---|---|
| 1,241,612 | Emerson | Oct. 2, 1917 |
| 1,682,572 | Keuffel | Aug. 28, 1928 |
| 2,192,580 | Sachtleben | Mar. 5, 1940 |
| 2,481,863 | Owens | Sept. 13, 1949 |
| 2,499,466 | De Forest et al. | Mar. 7, 1950 |